US010834279B1

(12) United States Patent
Jensen

(10) Patent No.: US 10,834,279 B1
(45) Date of Patent: Nov. 10, 2020

(54) SYSTEM AND METHOD FOR ASSISTED CONTROL OF DOCUMENT PROCESSING DEVICES

(71) Applicant: Toshiba TEC Kabushiki Kaisha, Shinagawa-ku (JP)

(72) Inventor: Gareth M. Jensen, Lake Forest, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/549,223

(22) Filed: Aug. 23, 2019

(51) Int. Cl.
*G06F 15/00* (2006.01)
*G06F 3/12* (2006.01)
*G06K 1/00* (2006.01)
*H04N 1/00* (2006.01)
*H04W 4/80* (2018.01)
*H04W 76/10* (2018.01)
*H04W 76/30* (2018.01)

(52) U.S. Cl.
CPC ....... *H04N 1/00488* (2013.01); *G06F 3/1204* (2013.01); *G06F 3/1236* (2013.01); *H04N 1/00395* (2013.01); *H04N 1/00403* (2013.01); *G06F 3/1292* (2013.01); *H04W 4/80* (2018.02); *H04W 76/10* (2018.02); *H04W 76/30* (2018.02)

(58) Field of Classification Search
CPC .......... H04N 1/00488; H04N 1/00395; H04N 1/00403; G06F 3/1204; G06F 3/1236; G06F 3/1292; H04W 76/30; H04W 76/10; H04W 4/80
USPC ....................................... 358/1.1, 1.13, 1.15
See application file for complete search history.

(56) References Cited

U.S. PATENT DOCUMENTS

2016/0019007 A1* 1/2016 Kurihara ............ H04N 1/00214
358/1.15
2019/0361633 A1* 11/2019 Wang ..................... G06F 3/1222
2020/0082402 A1* 3/2020 Patel ...................... G06Q 20/38

* cited by examiner

*Primary Examiner* — Douglas Q Tran
(74) *Attorney, Agent, or Firm* — Ulmer & Berne LLP

(57) ABSTRACT

A system and method for assisted multifunction peripheral user operations employs portable user data devices, such as smartphones or tablets, as an interface for visually impaired users. An application running on the user's device senses when it is proximate to a multifunction peripheral in accordance with a Bluetooth beacon. The user is notified on their device that the nearby multifunction peripheral is configured for audio interaction via the device. When the user accepts the notification, their device is automatically paired with the multifunction peripheral and the user's interactions and instructions can be audio or speech-based via the user's portable device.

20 Claims, 5 Drawing Sheets

SYSTEM AND METHOD FOR ASSISTED CONTROL OF DOCUMENT PROCESSING DEVICES

TECHNICAL FIELD

This application relates generally to assisting visually impaired users in the use and control of document processing devices. The application relates more particularly to use of handheld device, such as smartphone or tablet, to provide an audible and speech-based device user interface.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

User operation and control of MFPs is accomplished via an integrated user interface. A typical user interface includes a touchscreen. Touchscreens can be difficult or impossible to use by visually impaired users.

BRIEF DESCRIPTION OF THE DRAWINGS

Various embodiments will become better understood with regard to the following description, appended claims and accompanying drawings wherein:

DETAILED DESCRIPTION

Figure 1:
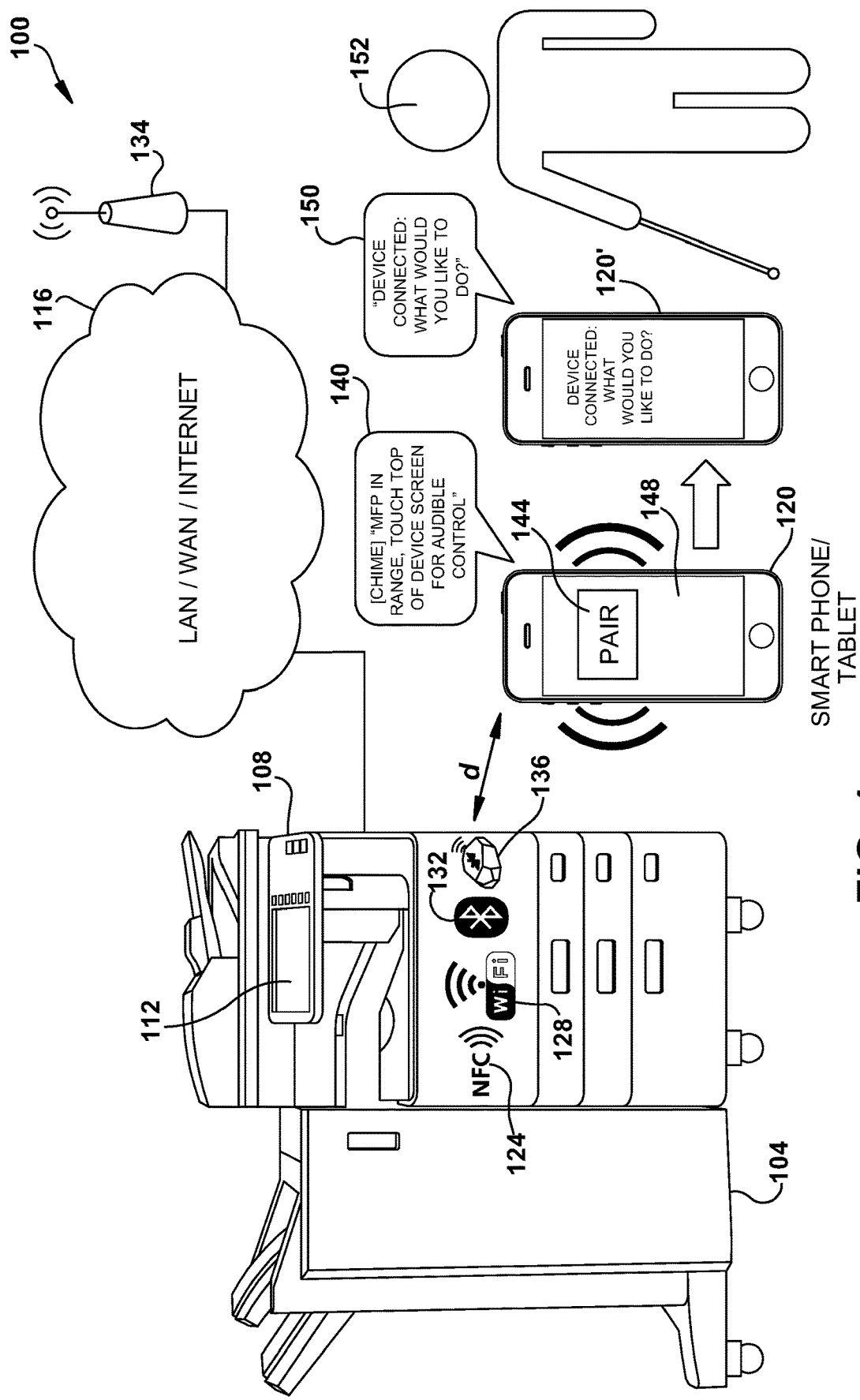
FIG. 1 is an example embodiment of a user device assisted multifunction peripheral interface system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In example embodiments herein, MFP interfacing takes advantage of portable data devices such Android and iOS smartphones or tablets which may include accessibility support for the visually impaired. In such devices, a user may navigate phone functions and app features through audio interfaces. Such portable data devices are equipped for outputting audio and receiving speech input given their integrated speakers or associated earpieces and microphone inputs. Audio input and output capabilities are not found in a typical MFP.

In example embodiments herein, a Bluetooth Low Energy (BLE) beacon provides for quickly performing actions on a smartphone through a notification menu based on proximity. The system uses existing hardware specifications to deliver audio assistance to visually impaired users using Bluetooth technologies and smartphone devices. This allows users to use their existing headphones to listen to on-screen menu options and printing statuses without the need for hardware modifications on an MFP. Such MFP capabilities may accomplished by a smartphone or tablet application, an MFP application or an MFP firmware update.

By way of example, workflow is suitably broken down into two steps: connecting and disconnecting. When a visually impaired user is ready to connect, they approach the MFP. Using a BLE beacon associated with the MFP, a notification will appear on the user's device, such as an Android or iOS device, to pair. Touching the notification will automatically pair the user's device with the MFP. Once paired, the device will begin talking to the user and provide information relative to the device's features, status and control options.

When the user is ready to disconnect, they need only walk away from the device, away from the beacon, or disconnect manually using their smartphone's notification menu. Audio suitably appears via an integrated device application, such as music player, through the device interface and is suitably accompanied by a close button to disconnect from the Bluetooth audio provider.

In another example embodiment, Bluetooth headphones are suitably paired with an MFP without the use of a smartphone. This is suitably provided by a menu setting for turning on Bluetooth pairing in a static place on the screen, such as a corner where it can be easily found by a visually impaired user.

If automatic pairing is not possible, such as when hardware does not include a Bluetooth adapter or when hardware has failed to pair, an in-browser solution can also be deployed for audio assistance. An in-browser solution can be deployed using Wi-Fi broadcasting instead of Bluetooth and a suitable adapter, such as a Chromecast type device. This is suitably implemented via an e-Bridge CloudConnect Print & Capture application, a product of Toshiba TEC.

FIG. 1 illustrates an example embodiment of a user device assisted MFP interface system 100. MFP 104 includes a user interface 108 suitably comprised of touchscreen 112. MFP 104 is in network communication with network cloud 116, suitably comprised of any wireless or wired local area network (LAN) or a wide area network (WAN) which can comprise the Internet, or any suitable combination thereof. Also in network communication are one or more digital devices including, for example smartphone 120. While the illustrated examples may be directed to a smartphone, it is to be appreciated that any suitable portable user device, such as a tablet or laptop having audible input and output capability and a wireless data interface can be used.

MFP 104 includes one or more wireless data connection interfaces, such as a near field communication interface 124, Wi-Fi interface 128, Bluetooth interface 132, or a beacon, illustrated as Bluetooth low energy (BLE) beacon 136. Communication with MFP 104 is also suitably accomplished via network 116 via Wi-Fi hotspot 134.

Bluetooth beacons are hardware transmitters. Bluetooth low energy devices broadcast their identifier to nearby portable electronic devices. This technology enables smartphones, tablets and other devices to perform actions when in close proximity to a beacon. Bluetooth beacons use Bluetooth low energy proximity sensing to transmit a universally unique identifier picked up by a compatible app or operating system. The identifier and several bytes sent with it can be used to determine the device's physical location, track users, or trigger a location-based action on the device such as triggering the use of a user's device as an MFP alternative, audio conversant interface. In the example of FIG. 1, smartphone 120 is brought near or proximate to MFP 140, such at a distance d, a distance at which smartphone 120 is aware that it is possible to connect or pair with MFP 104. Prompt 140 is suitably generated by smartphone 120, suitably audibly, visually, or both. A visual notation, such as large text or select button 144 on smartphone touchscreen 148 allows users with some sight ability to interact with the device. Prompt 140 is audible, and may include an alert, such as a chime, to get the attention of a visually impaired user 152. The prompt suitably includes verbal information to commence MFP device control or interaction. When smartphone 120 is paired for data communication with MFP 104, either automatically or by user selection, verbal interaction with user 152 commences as illustrated with smartphone 120' and prompt 150. Digitized speech is suitably communicated wirelessly between MFP 104 and smartphone 120. Similarly, digitized voice data from user 152 is suitably communicated wirelessly to MFP 104, wherein a suitable speech-to-text translation can be made. Such translated text is suitably parsed to determine associated instructions from user 152. Communication from MFP 104 to user 152 is suitably done with a text-to-speech conversion in MFP 104, digitized audio from which is sent wirelessly to smartphone 120 for playback. In accordance with the forgoing, heavy processing of text-to-speech and speech-to-text is completed with the more robust computing power associated with an intelligent controller of MFP 104, rather than with relatively constrained capabilities of smartphone 120.

Figure 2:
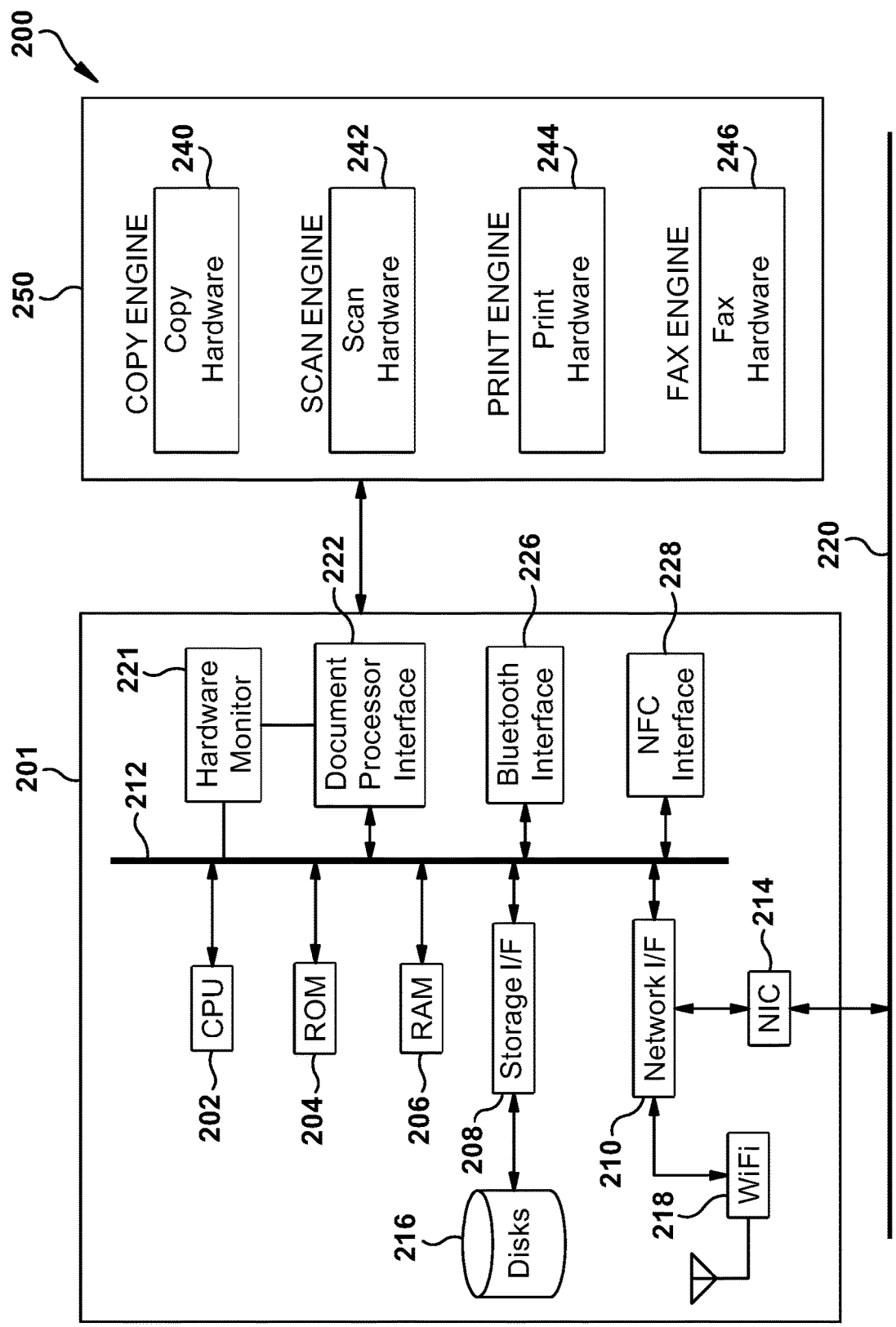
FIG. 2 is an example embodiment of a networked digital device such as a multifunction peripheral.

Turning now to FIG. 2 illustrated is an example embodiment of a networked digital device comprised of document rendering system 200 suitably comprised within an MFP, such as with MFP 104 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as Wi-Fi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 is also in data communication with a hardware monitor 221, suitably amassing state data from subassemblies, sensors, digital thermometers, or the like, and suitably including digital state date including device codes, such as device error codes. Processor 202 can also be in data communication a document processor interface 222, with BLUETOOTH interface 226 and NFC interface 228 via data path 212.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrated example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional hardware 250. It will be understood that functional units are suitably comprised of intelligent units, including any suitable hardware or software platform.

Figure 3:
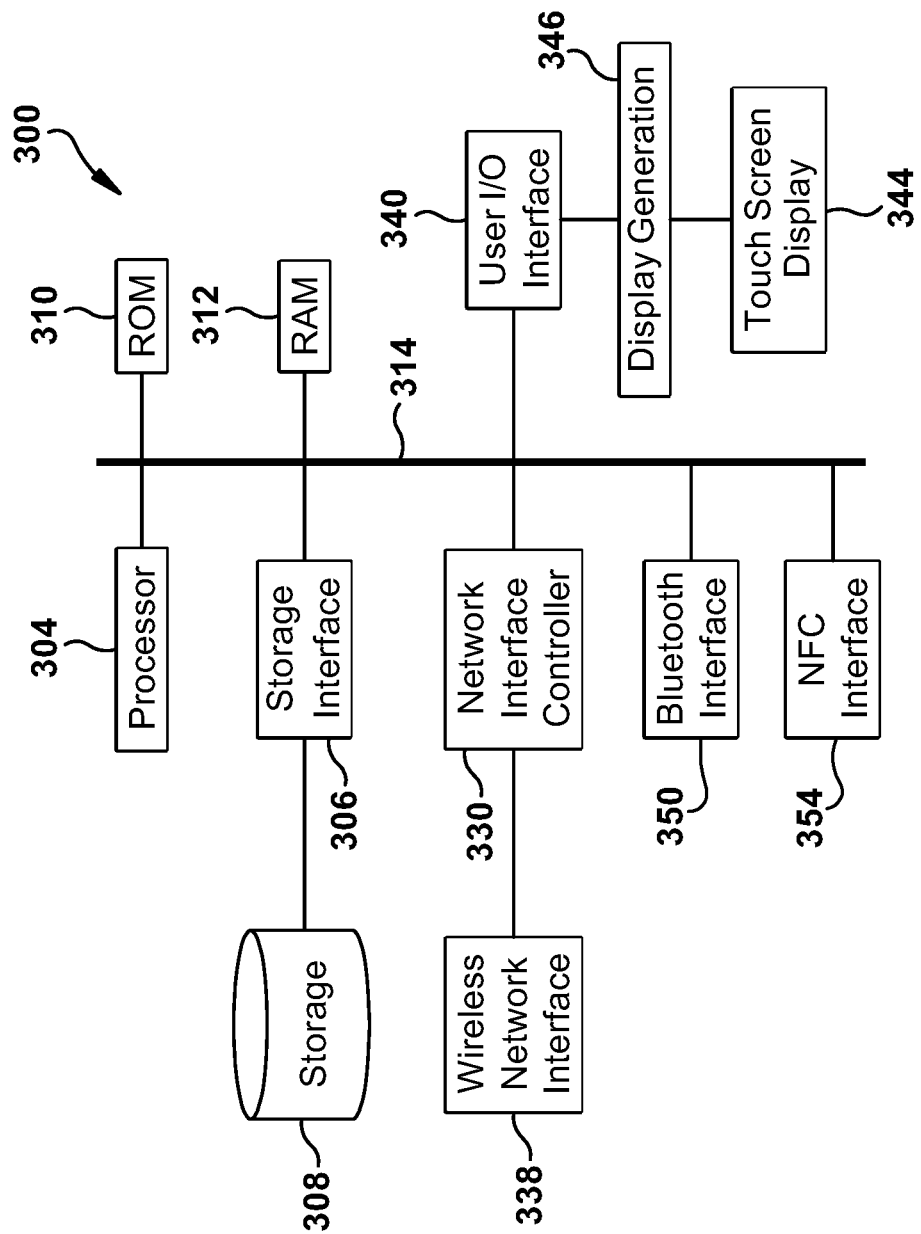
FIG. 3 is an example embodiment of a digital device system such as a laptop, smartphone or tablet computer.

Turning now to FIG. 3, illustrated is an example of a digital device system 300 suitably comprising a portable digital device, such as a smartphone or tablet as described above. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to an MFP or server is via a data network, such as a local area network (LAN), a wide area network (WAN), which may comprise the Internet, or any suitable combination thereof. A digital data connection is also suitably directly with an MFP or server, such as via Bluetooth, optical data transfer, Wi-Fi direct, NFC or the like. A Wi-Fi interface is also suitably used to receive a BLE beacon broadcast.

Processor 304 is also in data communication with a user input/output (I/O) interface 340 which provides data communication with user peripherals, such as touch screen display 344 via display generator 346, as well as keyboards, mice, track balls, touch screens, or the like. It will be understood that functional units are suitably comprised of intelligent units, including any suitable hardware or software platform.

Figure 4:
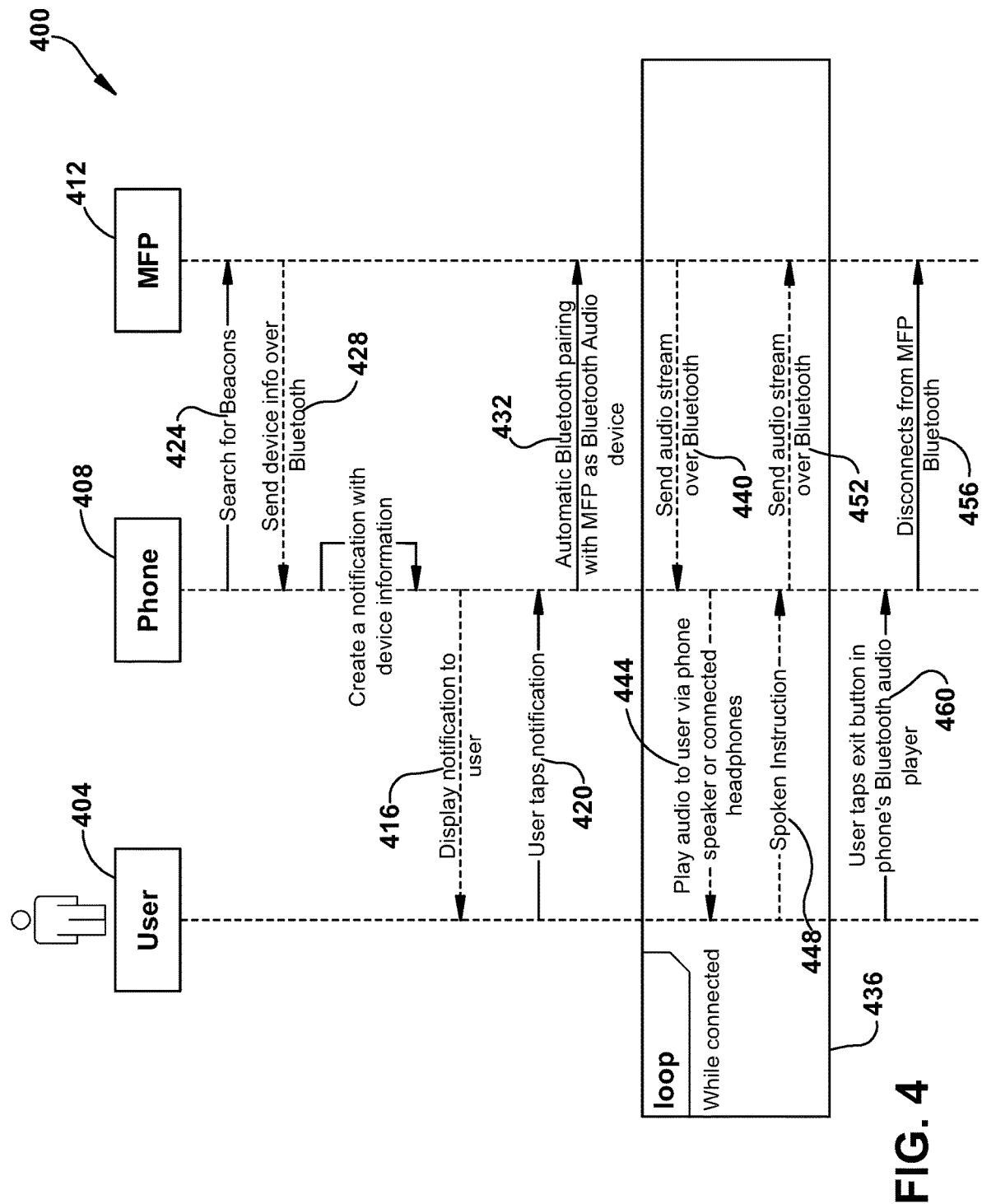
FIG. 4 is a flow diagram of an example embodiment of a user device assisted multifunction peripheral device interface system for visually impaired users.

FIG. 4 depicts a flow diagram 400 for a user device assisted MFP device interface system for visually impaired users. Interaction is between user 404, phone 408 and MFP 412. Interaction between user 404 and phone 408 includes a display of a notification 416 from phone 408 to user 404, which notification is suitably tapped on the phone touchscreen at 420. Interaction between phone 408 and MFP 412 includes a search for a beacon at 424 and, once a beacon is detected, MFP 412 sends device information to phone 408, suitably via Bluetooth, at 428. Phone 408 and MFP 412 are then paired automatically at 432.

Box 436 of FIG. 4 depicts interactions among user 404, phone 408 and MFP 412 while phone 408 is paired with MFP 412. During connection, MFP 412 sends one or more audio streams to phone 408 at 440, and phone 408 plays audio for user 404 at 444. Similarly, digitized user speech may be captured and digitized when spoken by user 404 at 448, and the user's digitized voice sent via Bluetooth as an audio stream at 452. A data exchange between phone 408 and MFP 412 is disconnected at 456 when instructed by the user 404, verbally or via the phone's touch screen interface at 460, or automatically when the phone 408 is no longer proximate to the MFP 412 as when a beacon is no longer sensed.

Figure 5:
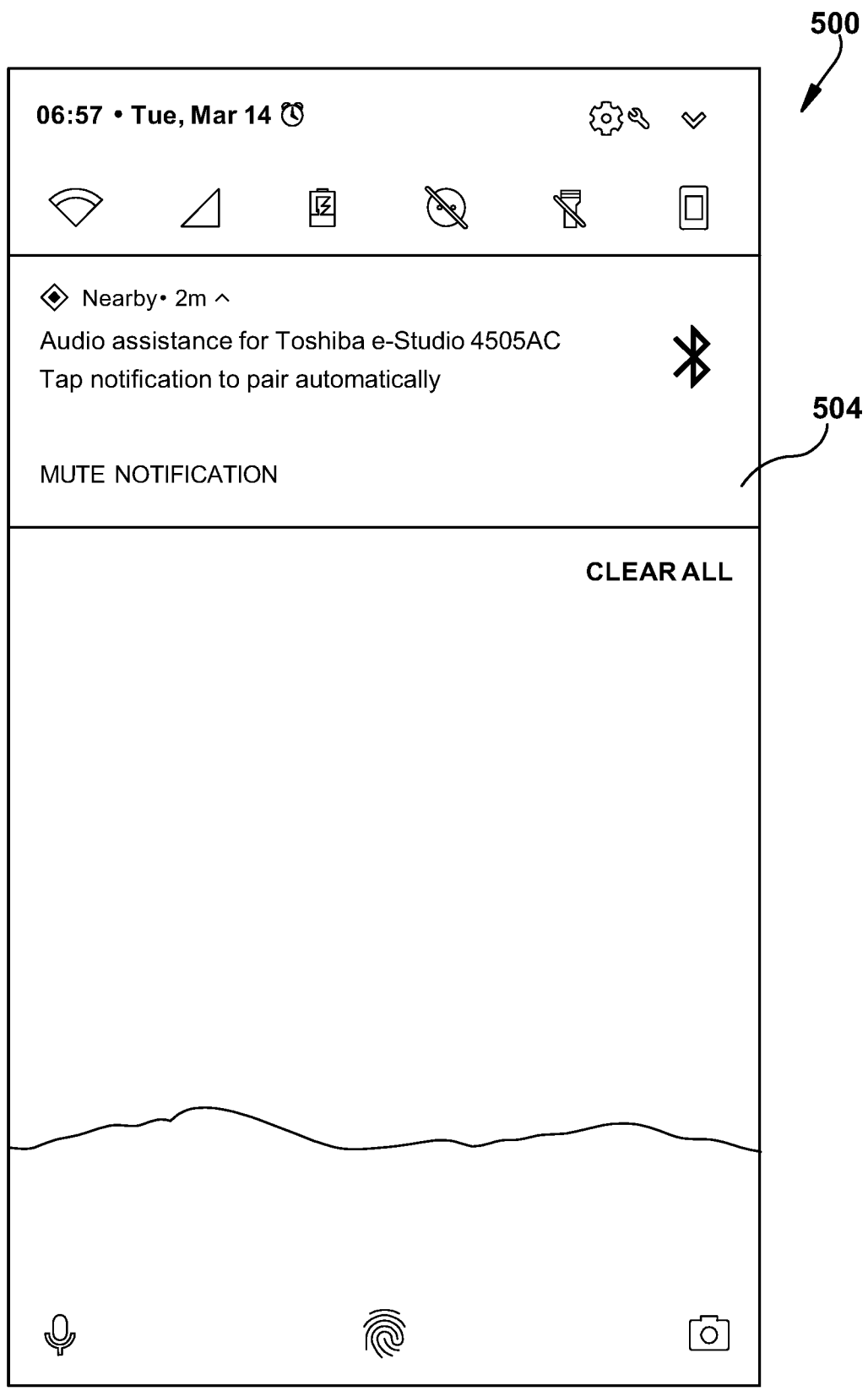
FIG. 5 is an example embodiment of a user device interface.

FIG. 5 is an example embodiment of a device user interface 500 such as may appear on a smartphone or tablet carried by a user as they approach an MFP and come within range such as may be indicated by a beacon or NFC. A notification window 504 appears, suitably accompanied by an audible alert. The user is notified via text, which text may be converted to speech, that an MFP is proximate and audio assisted device interaction is available. Pairing is suitably done automatically once the user taps notification window 504 or verbally instructs the MFP to pair for data exchange.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
   a scanner;
   a printer;
   an intelligent controller including a processor and memory, the intelligent controller configured to control operation of the scanner and the printer; and
   a wireless data interface configured for data communication with a user's portable data device,
   wherein the processor is configured to determine when the portable data device is proximate to the multifunction peripheral,
   wherein the processor is further configured to establish data communication with the portable data device via the wireless data interface,
   wherein the processor is further configured to pair with the portable data device as an audio device,
   wherein the processor is further configured to initiate one or more audible prompts on a user interface of the paired portable data device corresponding to a data interchange between the multifunction peripheral and the portable data device,
   wherein the processor is further configured to receive document processing instructions from the portable data device, and
   wherein the processor is further configured to control operation of the scanner or printer in accordance with received document processing instructions.

2. The multifunction peripheral of claim 1 wherein a prompt includes an audible output generated by the portable data device.

3. The multifunction peripheral of claim 2 wherein the document processing instructions are comprised of digitized speech from the user.

4. The multifunction peripheral of claim 3 wherein the processor is further configured to complete a speech-to-text conversion of the digitized speech to determine the document processing instructions.

5. The multifunction peripheral of claim 1 wherein the processor is further configured to pair the multifunction peripheral and the portable data device in accordance with a response to a prompt received via the wireless data interface.

6. The multifunction peripheral of claim 1 further comprising a beacon generator, and wherein the processor is configured to determine when the portable data devices is proximate in accordance with a data received from the portable data device responsive to a generated beacon.

7. The multifunction peripheral of claim 1 wherein a prompt is comprised of verbal output from a speaker on the portable data device.

8. The multifunction peripheral of claim 7 wherein a prompt is comprised of a wireless digital audio stream.

9. A method comprising:
   determining when a portable data device is proximate to a multifunction peripheral in accordance with a signal from a wireless beacon;
   establishing wireless data communication between the portable data device and the multifunction peripheral;
   pairing the multifunction peripheral with the portable data device as an audio device,
   initiating one or more audible prompts on a user interface of the paired portable data device corresponding to a data interchange between the multifunction peripheral and the portable data device via a wireless data interface;
   receiving document processing instructions from the portable data device via the wireless data interface; and
   scanning or printing via the multifunction peripheral in accordance with received document processing instructions.

10. The method claim 9 wherein a prompt includes an audible output generated by the portable data device.

11. The method of claim 10 further comprising receiving the document processing instructions as digitized speech from the user.

12. The method of claim 11 further comprising completing a speech-to-text conversion of the digitized speech to determine the document processing instructions.

13. The method of claim 9 further comprising pairing the multifunction peripheral and the portable data device in accordance with a response to a prompt received via the wireless data interface.

14. The method of claim 9 further comprising generating a beacon and determining when the portable data devices is proximate to the multifunction peripheral in accordance with a data received from the portable data device responsive to a generated beacon.

15. The method of claim 9 further comprising generating a prompt as verbal output from a speaker on the portable data device.

16. The method of claim 15 further comprising generating the prompt as a wireless digital audio stream.

17. A system comprising:
   a processor;
   a memory; and
   a wireless data interface,
   wherein the processor is configured to receive beacon data from an associated beacon indicative of proximity with a multifunction peripheral;

wherein the processor is further configured to commence a data communication session with the multifunction peripheral after receipt of the beacon data;

wherein the processor is further configured to pair with the multifunction peripheral as an audio device wherein the processor is further configured to receive one or more digital communication prompts from the multifunction peripheral via the wireless data interface;

wherein the processor is further configured to generate audio output in accordance with one or more received communication prompts; and wherein the processor is further configured to relay digitized speech responsive to the audio output received from an associated user to the multifunction peripheral.

18. The system of claim 17 wherein the processor is further configured to automatically establish a paired data communication session with the multifunction peripheral after receipt of the beacon data.

19. The system of claim 17 wherein the digitized speech is comprised of document processing instructions for the multifunction peripheral.

20. The system of claim 17 wherein the wireless data interface is comprised of a Bluetooth interface and wherein the beacon is comprised of a Bluetooth low energy beacon.

* * * * *